(12) United States Patent
Homiller

(10) Patent No.: US 6,839,548 B1
(45) Date of Patent: Jan. 4, 2005

(54) RADIO TRANSMITTER

(75) Inventor: Daniel Paul Homiller, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 966 days.

(21) Appl. No.: 08/609,308

(22) Filed: Mar. 1, 1996

(51) Int. Cl.[7] .................................................. H04B 17/00
(52) U.S. Cl. ............................ 455/86; 455/76; 455/113
(58) Field of Search ............................ 455/76, 112, 86, 455/91, 113, 118, 43, 84, 87, 77

(56) References Cited

U.S. PATENT DOCUMENTS

| | | | |
|---|---|---|---|
| 4,590,439 A | | 5/1986 | Goggin .......................... 331/1 |
| 4,603,304 A | | 7/1986 | Burns et al. .................... 331/2 |
| 4,670,888 A | * | 6/1987 | Smith, III .................... 375/303 |
| 4,864,634 A | * | 9/1989 | Nakagawa et al. ............ 455/76 |
| 5,065,408 A | * | 11/1991 | Gillig .......................... 375/222 |
| 5,230,088 A | | 7/1993 | Kramer, Jr. et al. .......... 455/76 |
| 5,276,915 A | | 1/1994 | Marko et al. ................. 455/86 |
| 5,291,474 A | | 3/1994 | Ikonen et al. ................. 370/30 |
| 5,319,799 A | * | 6/1994 | Morita ......................... 455/78 |
| 5,423,076 A | | 6/1995 | Westergren et al. .......... 455/86 |
| 5,444,737 A | | 8/1995 | Cripps et al. ................ 375/219 |
| 5,459,435 A | | 10/1995 | Taki .............................. 331/1 |
| 5,748,046 A | * | 5/1998 | Badger ........................ 331/17 |
| 6,647,247 B2 | * | 11/2003 | Vuolteenaho ................ 455/76 |

FOREIGN PATENT DOCUMENTS

| | | | |
|---|---|---|---|
| DE | 3411883 A | * | 10/1985 |
| JP | 4-245814 | * | 9/1992 |

* cited by examiner

*Primary Examiner*—Charles Appiah
(74) *Attorney, Agent, or Firm*—Carlos Munoz-Bustamante; Winstead, Sechrest & Minick, P.C.

(57) ABSTRACT

A radio communication device modulates a received audio signal with an intermediate frequency (IF) signal before mixing with the radio frequency (RF) waveform for transmission by an antenna. A voltage controlled oscillator is utilized, which is tuned to N times the desired IF frequency. This voltage controlled oscillator is frequency modulated with the inputted audio signal to a deviation N times the desired IF source deviation. The voltage controlled oscillator is locked in a phase locked loop with a system reference frequency so that the output frequency is N times the desired IF frequency. The output of the voltage controlled oscillator is supplied to a "divide-by-N" frequency prescaler for generating a signal at precisely the right IF frequency and deviation.

10 Claims, 1 Drawing Sheet

RADIO TRANSMITTER

TECHNICAL FIELD

This invention relates in general to radio communication devices, and in particular, to a radio transmitter.

BACKGROUND INFORMATION

There is presently an explosion in the demand for mobile communication devices, such as cellular telephones, two-way pagers, and wireless data transmission. Correspondingly, there is an ever increasing demand that such devices become smaller, lighter, and cheaper. Thus, there is always a desire when designing such communication devices to strive for designs that meet these criteria.

In many radio communication devices, upconversion is used to provide the modulated RF (radio frequency) output signal. For upconversion, an IF (intermediate frequency) source (typically in the 40 MHz to 300 MHz range) is mixed with an RF source. The IF source must be capable of being frequency modulated with deviations as high as 14 kHz. Typical IF sources have the following problems: (1) VCXOs (voltage controlled crystal oscillators) used in IF sources are difficult to modulate at these frequencies, and (2) conventional varactor-tuned oscillators are generally larger than desired and are not readily available.

Thus, there is a need in the art for an IF source that is small, inexpensive, capable of being frequency modulated, and easy to implement.

SUMMARY OF THE INVENTION

The foregoing need is satisfied by the present invention, which is a radio transmitter that uses a VCO tuned to a multiple of the desired IF source frequency. This VCO is locked in a PLL (phase locked loop) with the system reference frequency so that the output frequency is exactly equal to the multiple of the desired IF frequency. This VCO is frequency modulated to a peak deviation exactly this same multiple of the desired IF source deviation. This is inputted into a divide prescaler circuit for generating a signal precisely at the right IF source frequency and deviation.

More specifically, the present invention is a radio transmitter (for example, a radio transmitter used within a radio transceiver) having an IF source comprising (1) a VCO tuned to generate a first output frequency having a frequency value of f, wherein the VCO is modulated by an audio waveform, and (2) a frequency prescaler circuit for receiving the first output frequency generated by the VCO and generating a second output frequency having a frequency value of f/N, wherein N is greater than 0. The prescaler may include a "divide-by-N" circuit, which is a circuit capable of receiving a waveform of a first frequency and outputting a corresponding waveform having a second frequency, wherein the first frequency is N times that of the second frequency.

The radio transmitter may also include a circuit for feeding back an output signal from the VCO to a PLL integrated circuit (PLL IC), which is also operable for receiving a reference frequency waveform so that the output of the VCO is in phase alignment with the reference frequency waveform. The reference frequency waveform may originate from an oscillator that supplies this reference waveform for both a receiver and a transmitter within a radio transceiver. Further included may be a summing amplifier coupled between the PLL IC and the VCO, which is operable for receiving an output from the PLL IC and the audio waveform which will be modulated with the reference waveform in the VCO.

Furthermore, the radio transmitter may also include a mixer for receiving the IF waveform from the prescaler circuit, which is operable for mixing the IF waveform with an RF waveform to produce an RF signal to be transmitted by an antennae coupled to the radio transmitter.

An advantage of the present invention is that it is capable of utilizing VCOs that are easy to modulate at the required frequencies, and which are readily available and inexpensive.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
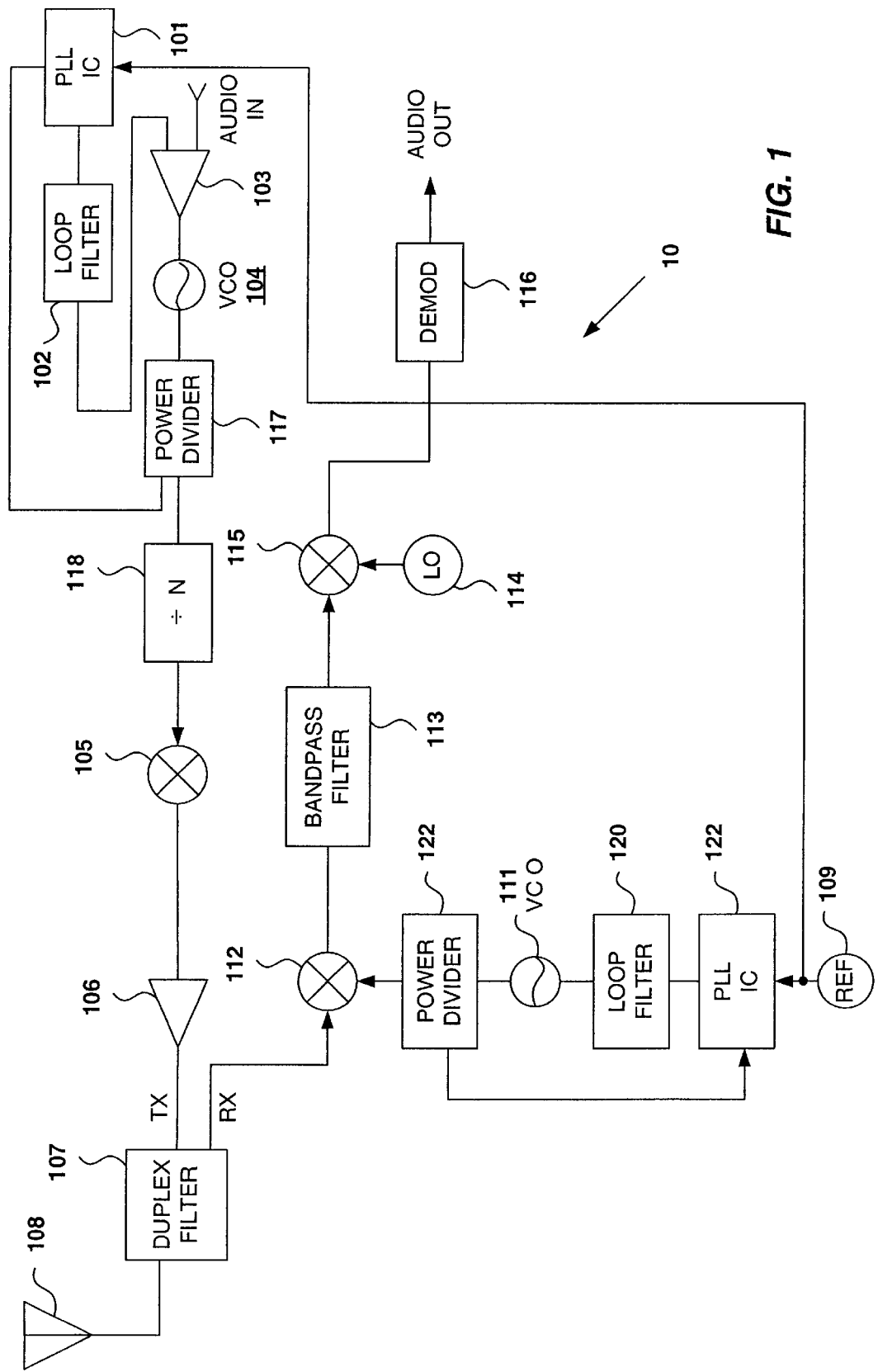
FIG. 1 illustrates a block diagram of a radio transceiver in accordance with the invention.

Since the apparatus for the most part is composed of electronic components and circuits known to those skilled in the art, circuit details will not be therefore explained to any greater extent than necessary for understanding and appreciating the underlying concepts of the present invention.

Referring to FIG. 1, there is shown radio transceiver 10 configured in accordance with the present invention. Radio transceiver 10 comprises receiver and transmitter portions. Filter 107, which could be an antennae switch or analog duplex filter, divides the transmit and receive portions with respect to antenna 108.

The receive portion of transceiver 10 may comprise any well-known circuitry for the receive portion of a transceiver. In the embodiment shown in FIG. 1, antenna 108 receives RF signals at a frequency selected for the particular situation for which transceiver 10 is designed. These RF signals are multiplied with a reference waveform at first mixer 112. The reference waveform is supplied by the circuitry comprising reference oscillator 109, PLL IC 110, loop filter 120, VCO 111, and power divider 122.

The term phase-locked loop refers to the subsystem comprising a VCO, a reference oscillator, a main frequency divider for dividing the VCO frequency down to a "comparison" frequency, a reference frequency divider for dividing the reference oscillator frequency down to the comparison frequency, a phase detector or phase/frequency detector, and a loop filter. A power divider of some sort is needed to feed the VCO output back to the main frequency divider. In typical implementations, the main and reference frequency dividers and the phase or phase/frequency detector are typically included in a single integrated circuit, often referred to as a PLL.

The output of first mixer 112 is applied to bandpass filter 113, producing a first intermediate frequency (IF) signal. This first IF signal is mixed with a second reference waveform supplied by local oscillator 114 within mixer 115 to produce a second IF signal. This output from second mixer 115 is then supplied to demodulator circuit 116, which demodulates the signal producing the audio signal outputted from transceiver 10.

Though FIG. 1 illustrates transceiver 10 having both receive and transmit portions, the present invention may be implemented within a device not including the receive portion.

In the transmit mode, audio waveforms are received in summing amplifier 103 for addition to a control signal produced by loop filter 102. The reference waveform supplied by reference oscillator 109 is inputted into PLL 101. The output of PLL 101 is supplied to loop filter 102. The control signal output of loop filter 102 determines the transient characteristics and phase noise performance of the output of VCO 104. The output of loop filter 102 is supplied to the other input of summing amplifier 103. Thus, the control signal is added to the inputted audio waveform. The audio waveform is scaled to the proper amplitude so as to frequency modulate VCO 104 to a deviation N times the desired IF source deviation. This is supplied to VCO 104, which is tuned to N times a desired IF frequency. The output of VCO 104 is supplied to power divider circuit 117, which is a power divider circuit typical in the art. Power divider circuit 117 provides the output of VCO 104 to "divide-by-N" frequency prescaler circuit 118 and to PLL 101.

Feeding back this signal to PLL 101 locks VCO 104 with the system reference waveform produced by reference oscillator 109.

"Divide-by-N" frequency prescaler 118 divides the frequency of the signal received from VCO 104 by N, thus generating a signal that is precisely at the right frequency and deviation of the IF frequency desired. The output of circuit 118 is supplied to mixer 105, which mixes this IF waveform with the RF source supplied from the output of power divider 122. This RF output is amplified by amplifier 106 and supplied to filter 107 for transmission by antenna 108.

As discussed above, crystal VCOs are difficult to modulate at certain frequencies. One solution to this problem is to use varactor-tuned oscillators using stripline or ceramic resonators. However, high-quality packaged oscillators of this type are generally larger than desired and are not readily available for these frequencies. The present invention solves the problem by permitting the designer to utilize a conventional VCO tuned to a multiple of the desired IF frequency needed within transceiver 10. Thus, a VCO that is easy to modulate with the audio input signal, and which is readily available and inexpensive, is used and then the "divide-by-N" frequency prescaler circuit is used to bring this higher output frequency of VCO 104 to the desired IF frequency needed for mixing with the RF frequency in mixer 105.

For example, for radio communication devices operating in the 900 MHz range (such as in cellular systems), an IF source in the 40–300 MHz range is needed to be mixed with an RF source. Additionally, this IF source must be capable of being modulated with deviations as high as 14 kHz. For such a constraint, crystal VCOs are difficult to modulate at such frequencies. To solve this particular problem, VCO 104 can be tuned to 8 times the desired IF frequency and modulated directly with the audio signal to a deviation 8 times the desired IF source deviation. Then, frequency prescaler 118 will divide by 8 the received signal thus generating a signal at precisely the right IF frequency and deviation. However, the present invention is not limited to these particular frequencies. Furthermore, the present invention may be utilized within other radio frequency devices other than transceiver 10.

Although the present invention and its advantages have been described in detail, it should be understood that various changes, substitutions and alterations can be made herein without departing from the spirit and scope of the invention as defined by the appended claims.

What is claimed is:

1. An intermediate frequency (IF) source, comprising:
   a voltage controlled oscillator (VCO) tuned to generate a first output frequency having a frequency value of f, wherein said VCO is frequency modulated by an audio waveform;
   a frequency prescaler for receiving said first output frequency and generating a second output frequency having a frequency value of f/N, wherein N is greater than one, said second output frequency being operable for mixing with an RF waveform; and
   a summing amplifier having an output coupled to said VCO, said summing amplifier receiving said audio waveform and a control signal.

2. The IF source as recited in claim 1, wherein said VCO is tuned to a frequency value that is N times a desired IF frequency value.

3. The IF source as recited in claim 1, wherein said control signal is received from a phase locked loop having an output coupled to said summing amplifier and having a first input coupled to an output of said VCO and a second output coupled to a reference oscillator providing a reference waveform.

4. A radio transmitter comprising:
   an IF source operable for modulating with an audio waveform, said IF source further comprising:
   a VCO operable for modulating with said audio waveform, said VCO having a first output signal of frequency value f, a prescaler operable for receiving said first output signal from said VCO and generating a second output signal of frequency value f/N, said second output signal being operable for mixing with an RF waveform wherein said IF source is operable for outputting an IF waveform modulated with said audio waveform, and
   a PLL operable for receiving a reference frequency waveform;
   a summing amplifier, coupled to said PLL, operable for receiving an output of said PLL and said audio waveform; and
   circuitry for feeding back said first output signal from said VCO to said PLL.

5. The radio transmitter as recited in claim 4, wherein said prescaler includes a "divide-by-N" circuit.

6. The radio transmitter as recited in claim 4 further comprising:
   a mixer operable for mixing said IF waveform modulated with said audio waveform with said RF waveform to produce an RF signal,
   an amplifier operable for amplifying said RF signal; and
   an antenna operable for transmitting said RF signal.

7. The radio transmitter as recited in claim 4, wherein said frequency value of f/N is between 40 and 300 MHz.

8. A radio transceiver comprising:
   an antenna;
   a radio receiver coupled to said antenna; and
   a radio transmitter coupled to said antenna, wherein said radio transmitter further comprises:
   an IF source operable for modulating with an audio waveform, said IF source having a frequency value of F, said IF source further comprising:

a VCO operable for modulating with said audio waveform, said VCO having a first output signal of frequency value f;

a prescaler operable for receiving said first output signal from said VCO and generating a second output signal of frequency value f/N, which is equal to F and wherein said prescaler includes a "divide-by-N" circuit;

a PLL operable for receiving a reference frequency waveform, a summing amplifier, coupled to said PLL, operable for receiving an output of said PLL and said audio waveform; and circuitry for feeding back said first output signal from said VCO to said PLL.

9. The radio transceiver as recited in claim 8, further comprising:

a mixer operable for mixing said IF waveform modulated with said audio waveform with said RF waveform to produce an RF signal;

an amplifier operable for amplifying said RF signal; and an antenna operable for transmitting said RF signal.

10. The radio transceiver as recited in claim 9, wherein said frequency value of F is between 40 and 300 MHz.

* * * * *